June 22, 1965  N. B. HAZELDINE ETAL  3,190,761
DEHYDRATION OF BRUSSELS SPROUTS
Filed June 4, 1962  2 Sheets-Sheet 1
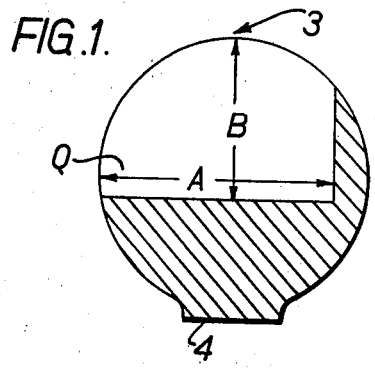
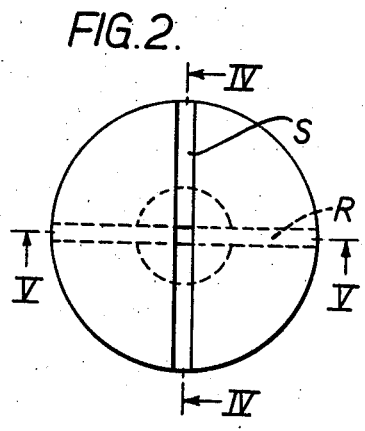
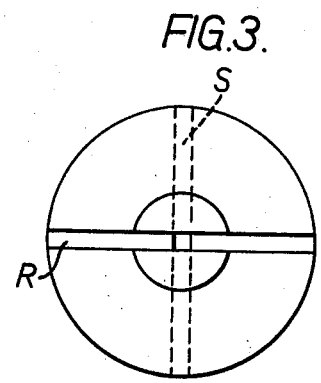
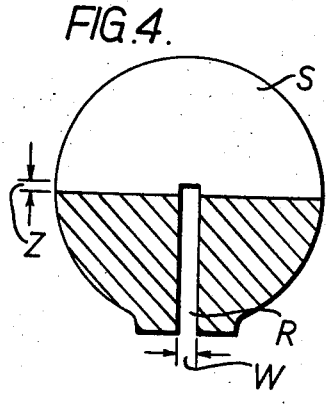
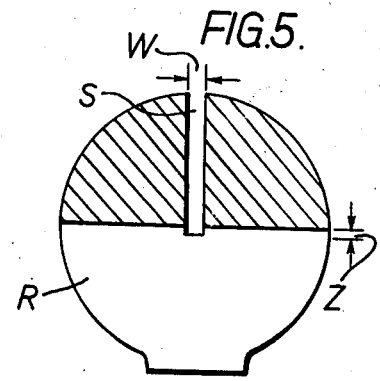
Norman B. Hazeldine
Marian K. Withers
by Brumbaugh, Free, Graves & Donohue,
Attorneys.

June 22, 1965    N. B. HAZELDINE ETAL    3,190,761
DEHYDRATION OF BRUSSELS SPROUTS
Filed June 4, 1962    2 Sheets-Sheet 2

Norman B. Hazeldine
Marian K. Withers
by Brumbaugh, Free, Graves & Donohue
Attorneys

—

United States Patent Office 3,190,761
Patented June 22, 1965

3,190,761
DEHYDRATION OF BRUSSELS SPROUTS
Norman Bernard Hazeldine, Bedford, and Marian Kathleen Withers, Kempston, England, assignors to Lever Brothers Company, New York, N.Y., a corporation of Maine
Filed June 4, 1962, Ser. No. 199,715
Claims priority, application Great Britain, June 5, 1961, 20,163/61
9 Claims. (Cl. 99—204)

This invention relates to the dehydration of vegetables and, in particular, to the dehydration of Brussels sprouts.

Brussels sprouts consist of a more or less spherical part with a diameter of from about 1.5 cm. to about 4 cm., hereinafter called the head, which tapers at one side to a more or less cylindrical part which is the cut residue of the stalk by which the sprout was originally attached to the main stem of the plant; this residue is hereinafter called the butt. That part of the head diametrically opposite the butt is known as the apex and the center and diameter of the head are, for simplicity, called the center and diameter of the sprout. For the purposes of this specification the center of the sprout is taken to be a spherical volume with a radius of about 0.2 cm. about the true geometrical center.

Although the dehydration of vegetables in general is well known and is practiced on a very large scale, it is a matter of difficulty to dehydrate Brussels sprouts satisfactorily—other, perhaps, than very small ones—in the whole state. Dehydration can be carried out on Brussels sprouts halved by a diametrical cut through the butt, but the resultant product, after dehydration, has an unattractive appearance; the consumer normally likes to deal with sprouts that are whole, or substantially so.

Dehydrated Brussels sprouts in the substantially whole state can be produced by first making through the butt a diametrical cut towards the apex in such a way that the sprout remains a firm whole during and after dehydration, but this procedure tends to produce sprouts showing extensive discoloration.

It has now been found that Brussels sprouts can be satisfactorily dehydrated in the substantially whole state by making in them, before dehydration, at least two cuts in a special manner. These cuts extend from the periphery of the sprout of the center, thus lying substantially in the planes of great circles, and at least one of these cuts passes within 45° of the axis of the butt and at least one other cut passes within 45° of the apex. That is, at least one of these cuts intersects the base of a cone having (a) an axis coincident with the axis of the butt, (b) a vertex coincident with the geometrical center of the sprout, (c) a generatrix forming an angle of 45° with the axis of the butt, and (d) an intersection with the surface of the sprout encircling the butt, and at least one other of these cuts intersects the base of a cone having (a) an axis coincident with an extension of the axis of the butt, (b) a vertex coincident with the geometrical center of the sprout, (c) a generatrix forming an angle of 45° with the extension, and (d) an intersection with the surface of the sprout encircling the apex of the sprout. The cuts are so arranged that they do not divide the sprout into two or more separate pieces; and if none of the said cuts passes through the butt at least one additional cut is made to pass therethrough. It is desirable that any such additional cuts which are made in the butt should extend across its width and should not be in the form of a round or slit-shaped hole. At least one cut extending from the region of the apex to the center must be an extensive cut, that is, one which at the level of the center of the sprout has a length of not less than 75% of the diameter of the sprout, and preferably has a length of 100% of the diameter of the sprout—that is, it passes completely through the sprout at any given level. The other cut or cuts may be shorter than the said extensive cut, although it is preferred that one cut from the butt region to the center is also an extensive cut in the sense given above. Where there is only one cut that is extensive, one other cut preferably passes completely through the sprout from butt to apex.

In one preferred embodiment of the invention there are only two cuts, the first passing through the butt and the second passing within 45° of, and preferably through, the apex of the sprout. However, where only two cuts are used it may be troublesome to ensure that at least one of them passes through the butt when the cuts are to be made by machinery. In another preferred embodiment, therefore, three cuts are made, two substantially at right angles to one another through the butt region and one through or near the apex. Provided that the two cuts through the butt region are sufficiently deep and that their alignment is not hopelessly incorrect at least one of them will pass through the butt.

The cuts will normally be plane cuts, but cuts curved in one or two directions may also be used, provided that the radii of curvature are large in comparison with the radius of the head of the sprout.

The cuts through the butt region and through the apex region may meet or overlap at the center provided that the integrity of the sprout is preserved. Thus, for example, in a preferred case, where there are only two plane cuts, the first of which passes through the butt and the second of which passes substantially through the apex, it may be arranged either that the depths of the cuts are such that they do not quite meet at the center, or, preferably, that they do intersect at the center (each passing a short distance—say, up to one quarter of the radius of the sprout—beyond the center), in which case, to preserve the integrity of the sprout, it is necessary that the cuts meet at an angle, suitably an angle greater than 30° and preferably at an angle of about 90°. This relative disposition of the cuts is the one employed in the examples given later.

In addition to the cuts already mentioned, extra minor cuts may be made in the sprout if this is desired for any reason. For example, it has been found that additional minor cuts (of the order of 0.5 cm. deep) in the butt region of the sprout may improve its appearance on rehydration.

The cuts may be made by hand or by machinery.

The sprouts cut in accordance with the invention are subsequently subjected to normal dehydrating procedures (preferably drying at elevated temperatures, as by circulation of hot air to contact the sprouts) and dehydrate uniformly and well, with no extensive discoloration. On rehydration, they readily take up water and regain substantially their original appearance, the cuts being barely noticeable. After cooking, their flavour and consistency is found to be satisfactory.

The invention will be further illustrated by the following examples and by the accompanying diagrammatic drawings, in which:

FIGURE 1 is a section of a sprout along the axis of its butt;

FIGURE 2 is a view of a sprout cut in accordance with the invention, the view being towards the apex;

FIGURE 3 is a view of the sprout in FIGURE 2, the view being towards the butt;

FIGURE 4 is a section, rotated approximately 90′ clockwise, along the line IV—IV in FIGURE 2;

FIGURE 5 is a section along the line V—V in FIGURE 2;

FIGURE 1 has been inserted to illustrate more clearly the terms length and depth of cut, as used herein. In FIGURE 1, in which Q is a cut along the axis of the butt, the cut is of length A and depth B; 3 is the apex of the sprout and 4 is the butt.

*Example 1*

Brussels sprouts with a diameter of between about 1.5 and 3.2 cm. were hand-trimmed and in each were made two extensive diametrical plane cuts, one (R) from the butt to the center and the second (S), at right angles to the first, from the apex to the center, the cuts intersecting at the center to the extent (Z) of about 0.3 cm. The width (W) of the cut is, for clarity, somewhat exaggerated. The cut sprouts were held for 10 minutes at 45° C. in a solution containing 2.5% of common salt, 1.25% of sodium sulphite and 1.5% of sodium carbonate. After straining, they were blanched in steam for two minutes and dried by the forced circulation of air at 52° C. through them for three hours, the air velocity being 178 cm. per second. This was followed by bin drying overnight (approximately 16 hours) at 52° C. but with an air velocity of 61 cm. per second. The dried sprouts had a water content of 5.7%, the ratio of the initial weight being 7.2:1. They were cooked by being put in cold water, brought to the boil and simmered for six minutes. Rehydration was satisfactory and the sprouts had a good colour and appearance, the cuts being barely noticeable. The ratio of the rehydrated weight to the dried weight was 6.6:1, this being a 92% rehydration.

*Example 2*

Figure 6:
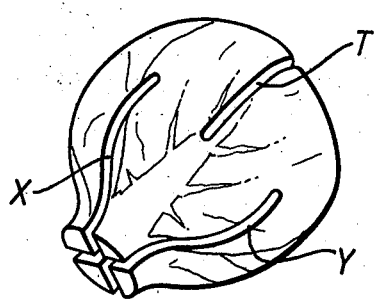
FIGURE 6 is a perspective view of another sprout cut in accordance with the invention.
Figure 7:
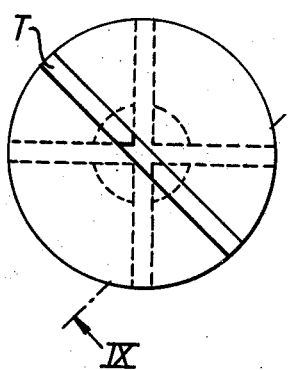
FIGURE 7 is a view of the sprout in FIGURE 6, the view being towards the apex.
Figure 8:
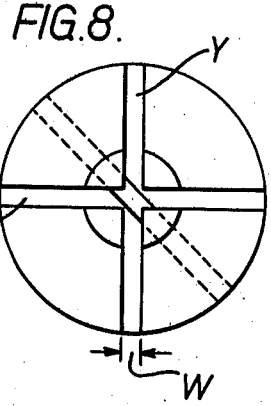
FIGURE 8 is a view of the sprout in FIGURE 6, the view being towards the butt.
Figure 9:
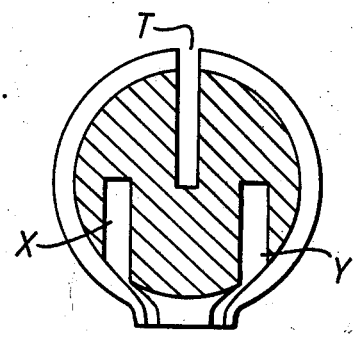
FIGURE 9 is a section, rotated approximately 45° clockwise, along the line IX—IX of FIGURE 7.

Brussels sprouts with a diameter of between 1.5 and 3.2 cm. were machine cut so that in each sprout were made three extensive cuts, one (T) from the apex to the center and two (X and Y), at right angles to each other and at an angle of about 45° to cut T, through the butt (FIGS. 6 to 9). All three cuts penetrated into the center of the sprout, the cut (T) from the apex intersecting cuts X and Y to the extent of about 0.15 cm.

The cut sprouts were steam blanched at 99° C. for 3 minutes, and were then held for 1.5 minutes at 45° C. in a solution containing 2.5% of common salt, 1% of sodium sulphite and 0.25% of sodium di-hydrogen phosphate. After straining, the sprouts were dried by the forced circulation of air at 50° C. through them for 20 hours, the air velocity being 150 cm. per second. The dried sprouts had a water content of 5%. The sprouts were cooked by being put in cold water, brought to the boil and simmered for six minutes. Rehydration was satisfactory.

What is claimed is:

1. A process for dehydrating Brussels sprouts in which in each sprout before dehydration there are made at least two cuts extending from the periphery of the sprout to within about 0.2 centimeter of the geometrical center of the sprout, said cuts thus lying substantially in the planes of great circles, at least one of these cuts intersecting the base of a cone having (a) an axis coincident with the axis of the butt, (b) a vertex coincident with the geometrical center of said sprout, (c) a generatrix forming an angle of 45° with the axis of said butt, and (d) an intersection with the surface of said sprout encircling said butt and at least one other cut intersecting the base of a cone having (a) an axis coincident with an extension of the axis of said butt, (b) a vertex coincident with the geometrical center of said sprout, (c) a generatrix forming an angle of 45° with said extension, and (d) an intersection with the surface of said sprout encircling the apex of said sprout, at least one of these cuts at the level of the center of the sprout having a length at least equal to 75% of the diameter of the sprout; with the provisos that the cuts are so arranged that they do not divide the sprout into at least two separate pieces, and that if none of the said cuts passes through the butt at least one additional cut is made to pass therethrough, said additional cut being of such a depth as to ensure that the butt is dehydrated during the dehydration process to about the same extent as the remainder of the sprout and being so arranged with respect to the other two cuts that the three cuts do not divide the sprout into at least two separate pieces and the sprout remains structurally intact.

2. A process for dehydrating Brussels spouts in which in each sprout before dehydration there are made at least two cuts extending from the periphery of the sprout to within about 0.2 centimeter of the geometrical center of the sprout, said cuts thus lying substantially in the planes of great circles, one of these cuts passing through the butt and the second intersecting the base of a cone having (a) an axis coincident with an extension of the axis of said butt, (b) a vertex coincident with the geometrical center of said sprout, (c) a generatrix forming an angle of 45° with said extension, and (d) an intersection with the surface of said sprout encircling the apex of said sprout, and at least one of these cuts at the level of the center of the sprout having a length at least equal to 75% of the diameter of the sprout; with the proviso that the cuts are so arranged that they do not divide the sprout into at least two separate pieces.

3. A process according to claim 2, in which the second cut passes substantially through the apex of the sprout.

4. A process according to claim 1, in which at least three cuts are made, two of such cuts being through the butt region and the three cuts being so arranged with respect to each other that they do not divide the sprout into at least two separate pieces and the sprout remains structurally intact.

5. A process according to claim 4, in which the two cuts through the butt region are substantially at right angles to each other.

6. A process for dehydrating Brussels sprouts in which in each sprout before dehydration there are made at least two cuts extending from the periphery of the sprout to within about 0.2 centimeter of the geometrical center of the sprout, said cuts thus lying substantially in the planes of great circles, at least one of these cuts intersecting the base of a cone having (a) an axis coincident with the axis of the butt, (b) a vertex coincident with the geometrical center of said sprout, (c) a generatrix forming an angle of 45° with the axis of said butt, and (d) an intersection with the surface of said sprout encircling said butt and at least one other cut intersecting the base of a cone having (a) an axis coincident with an extension of the axis of said butt, (b) a vertex coincident with the geometrical center of said sprout, (c) a generatrix forming an angle of 45° with said extension, and (d) an intersection with the surface of said sprout encircling the apex of said sprout, at least one of these cuts at the level of the center of the sprout having a length at least equal to 75% of the diameter of the sprout and said cut through the butt region intersecting said cut through the apex region with the provisos that the cuts are so arranged that they do not divide the sprout into at least two separate pieces, and that if none of the said cuts passes through the butt at least one additional cut is made to pass therethrough, said additional cut being of such a depth as to ensure that the butt is dehydrated during the dehydration process to about the same extent as the remainder of the sprout and being so arranged with respect to the other two cuts that the three cuts do not divide the sprout into at least two separate pieces and the sprout remains structurally intact.

7. A process for dehydrating Brussels sprouts in which in each sprout before dehydration there are made two cuts extending from the periphery of the sprout to within about 0.2 centimeter of the geometrical center of the sprout, said cuts thus lying substantially in the planes of great circles, one of these cuts intersecting the base of a cone having (a) an axis coincident with the axis of the butt, (b) a vertex coincident with the geometrical center of said sprout, (c) a generatrix forming an angle of 45° with the axis of said butt, and (d) an intersection with the surface of said sprout encircling said butt and the other of said cuts intersecting the base of a cone having (a) an axis coincident with an extension of the axis of said butt, (b) a vertex coincident with the geometrical center of said sprout, (c) a generaltrix forming an angle of 45° with said extension, and (d) an intersection with the surface of said sprout encircling the apex of said sprout, at least one of said cuts at the level of the center of the sprout having a length at least equal to 75% of the diameter of the sprout, and said cuts intersecting each other within about 0.2 centimeter of the geometrical center of the sprout at an angle greater than 30°.

8. A process according to claim 1, in which dehydration is carried out at an elevated temperature.

9. A process according to claim 8, in which dehydration is carried out by contacting the sprouts with hot air.

References Cited by the Examiner

"Food Industries," March 1942, page 48 (article by Cruess et al.).

Von Loesecke: "Drying and Dehydration of Foods," New York, 1943, page 94.

A. LOUIS MONACELL, *Primary Examiner.*

ABRAHAM H. WINKELSTEIN, *Examiner.*